United States Patent [19]

Buczek et al.

[11] Patent Number: 4,825,715

[45] Date of Patent: May 2, 1989

[54] GEAR TRANSMISSION AND METHOD OF MACHINING ITS TEETH

[75] Inventors: Jan Buczek; Witos aw Buczek, both of Rzeszów; Tadeusz Warzybok, Lubenia, all of Poland

[73] Assignees: Politechnika Rzeszowska im. Ignacego Lukasiewicza; Wojewodzki Klub Techniki i Racjonalizacji Zaklad Uslug Technicznych w Rzeszowie, both of Rzeszow, Poland

[21] Appl. No.: 133,559

[22] Filed: Dec. 16, 1987

[30] Foreign Application Priority Data

Dec. 17, 1986 [PL] Poland .................................. 263105

[51] Int. Cl.$^4$ ............................................. F16H 55/06
[52] U.S. Cl. .................................... 74/462; 29/159.2; 409/47
[58] Field of Search ................. 74/457, 462; 29/159.2; 409/47

[56] References Cited

U.S. PATENT DOCUMENTS 1,978,924  10/1934  Wildhaber ............................. 409/47
3,180,172  4/1965  Leggatt .................................. 74/462
4,679,459  7/1987  F'Geppert ......................... 74/462 X

FOREIGN PATENT DOCUMENTS 76184  2/1975  Poland .

Primary Examiner—Allan D. Herrmann
Attorney, Agent, or Firm—Ladas & Parry

[57] ABSTRACT

A gear transmission with a variable pressure angle has the following meshing geometry: a contact ratio greater than one, height of the addendum of gear and pinion teeth being a function of its module "m" determined by the relationship $m < h_g < 1.8$, a height of a tooth root of the pinion being limited by the value of a profile angle $\alpha_z$ equal to $\alpha_z \geq 8°$, a height of a tooth root of the gear determined by the relationship $m < H_s < 1.8\,m$ and increased by the value of radial clearance and a height of an addendum of the greater teeth equal to the height of the tooth root of gear and pinion, decreased by the value of radial clearance. The teeth are made with racks of involute profile having cutting edges and their constant base circle determined from apparent number of teeth and a constant pressure angle.

2 Claims, 2 Drawing Sheets

GEAR TRANSMISSION AND METHOD OF MACHINING ITS TEETH

This invention relates to a gear transmission with a variable pressure angle and a method of machining gear tooth profiles for it.

Those skilled in the art know involute gear transmission with convex and concave tooth profiles having a constant pressure angle. This is the result of unwinding their involute profiles from a constant base circle. Their constant pressure angle determines their geometry of meshing and the geometry of teeth of intermating gear wheels.

A drawback of the above mentioned transmission is an extremely unfavorable geometry of meshing of the intermating gear wheels, leading to considerable contact stresses. That is, the teeth of the intermating wheels enter into contact with each other at necessarily small points of convexities.

In order to increase their load capacity, they are subjected to special heat-chemical treatment and high-grade steels are used to accommodate considerable surface pressures. The gear wheel teeth are also specially finished. All this raises considerably the costs of production of the gear transmission.

Other known designs for improving the meshing of the gear wheel teeth, such as, e.g., the gear transmission according to Polish Patent Specification No. 76,184, gear transmission made by Vickers, or gear transmission having Wildhaber's or Novikov's meshing have not found wide use. Both the gear transmission according to the Polish Patent Specification No. 76,184, the wheels of which have low teeth with involute concave and convex profiles, as well as the Vickers' gear transmission have the teeth profiles of the pinion and the gear wheel made by means of racks having a constant inclination angle of cutting edges, usually 20 degrees. Teeth profiles of the gear wheel and the pinion are obtain by correction shifting the profile, negatively for teeth with a negative curvature and positively for teeth with a positive curvature. Moreover, in the gear transmission according to the Polish Patent Specification No. 76,184, the pinion addendum diameter is equal to the generating diameter, the latter being, in turn, equal to the pitch diameter. As a result, the tooth addendum height coefficient is zero and the teeth of the toothed wheel with a negative curvature have an addendum coefficient of about one. Further, the tooth root height is equal to the radial clearance. In the case of meshing with cylindrical gears with straight teeth, the tooth contact ratio is smaller than one, which entails a serious limitation of the scope of application of the gear wheels with oblique teeth. In turn, the Wildhaber or Novikov gear wheels with circular-arced profiles enable unit tooth pressures to be decreased, but they have other serious drawbacks. Specifically, they are very sensitive to accurate setting of the axial distance and the bending strength of their teeth is very small.

An object of the present invention is elimination of the above mentioned drawbacks of the known gear transmissions.

The object of the invention has been accomplished with a gear transmission having a meshing geometry with the following parameters: contact ratio greater than one, addendum of pinion teeth being a function of its module being greater than that module, but not exceeding 1.8 of that module, pinion tooth root being limited by the pressure angle, the value of which must not be smaller than 8 degrees, gear wheel tooth root height being a function of its module being greater than that module, but not exceeding 1.8 of that module, said height increased by the value of the radial clearance, said addendum of the gear wheel being equal to the height of the tooth root of the pinion.

The method of machining a tooth profile for a gear transmission with a variable pressure angle according to the invention consists in that, for appropriately shaping the tooth profiles of the pinion and the gear wheel, special racks with an involute cutting edge profile and a constant base circle thereof are used. The base circle is determined from the apparent number of teeth and a constant pressure angle of said racks, said racks being placed in such a position relative to the pinion and gear wheel to be machined as to obtain a pressure angle of the generating circles intermated with each other on the generating circles equal to the sum or difference of a constant pressure angle of machining racks and the angle of rotation of a constant pressure angle of the machining racks around the axis of said racks.

Advantageous effects obtainable due to the design according to this invention as compared with the other designs so far known are as follows: considerable reduction of contact stresses (i.e., several score times), reduction of slippage of teeth and thus smaller losses of energy being transmitted, as well as better lubrication. Owing to a variable pressure angle, variable base circle, from which involute is unwound, and a constant ratio smaller than one, the meshing geometry according to the invention can be applied by cylindrical gear wheels with straight and oblique teeth, in bevel gears with straight and oblique teeth, as well as in worm gears. Considerable reduction of contact pressures enables overall dimensions of the toothed wheels and gear transmissions to be diminished.

The subject of the invention has been presented on an example of embodiment shown in the accompanying drawing, wherein.

Figure 1:
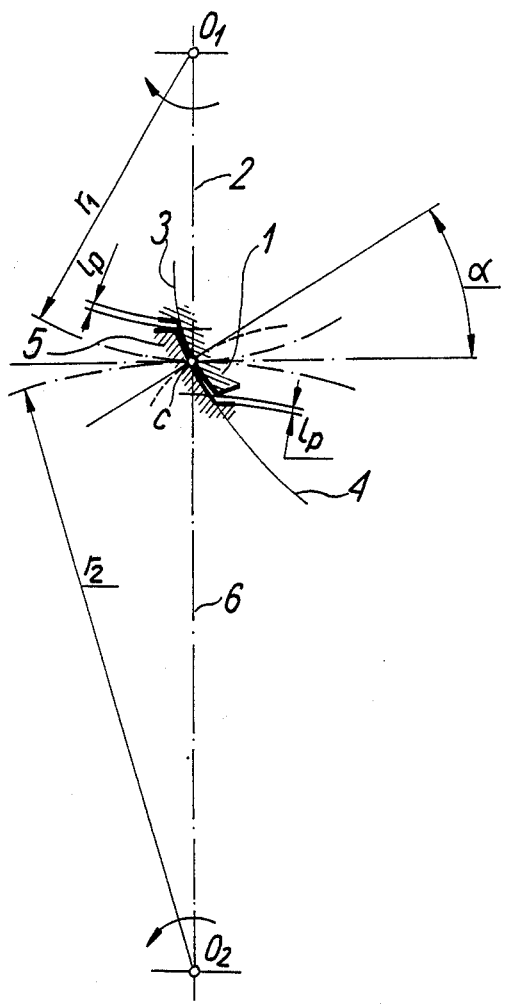
FIG. 1 is a normal cross section of a meshing portion of a gear transmission according to the invention, together with the meshing geometry thereof.
Figure 2:
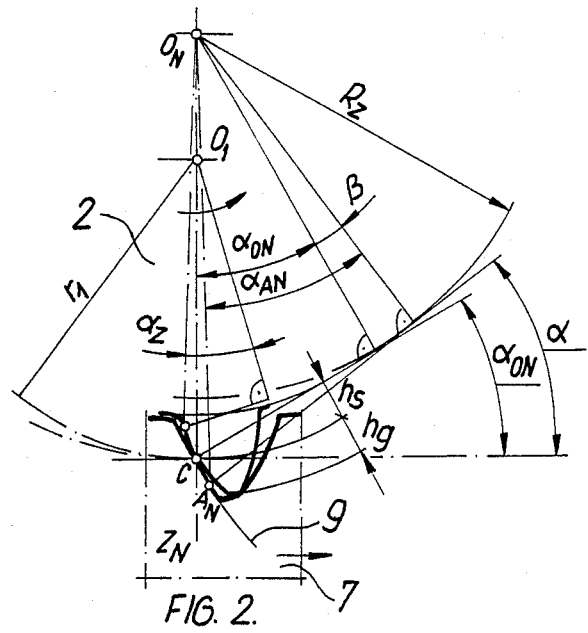
FIG. 2 is a normal cross section of a meshing portion of a rack transmission according to the invention, together with the meshing geometry thereof.
Figure 3:
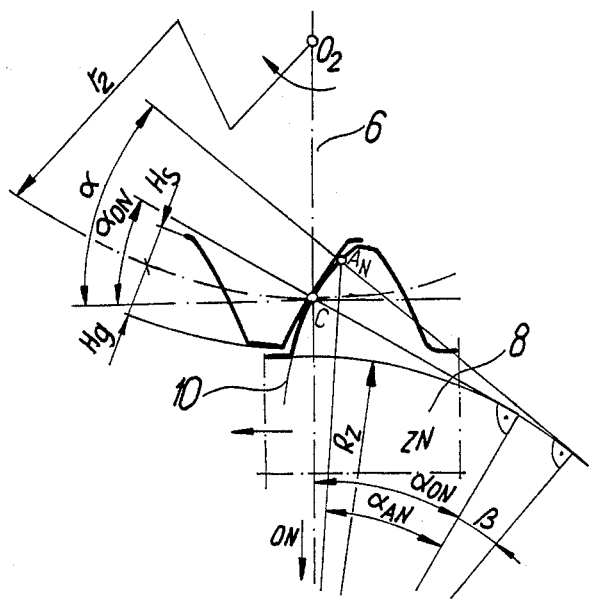
FIG. 3 is a normal cross section of a meshing portion of a rack-and-gear transmission according to the invention, together with the meshing geometry thereof.

As may be seen in the figures, the teeth 1 of the pinion 2 having an involute shape with a positive curvature 3 are intermated with the profile 4 with a negative curvature of the tooth 5 of the gear wheel 6. Cutting edges 8 of the racks of the pinion 7 have a shape of an involute unwound from the base circle $R_z$ determined by the apparent number of teeth $Z_n$ and a constant pressure angle of said racks. During wheel generation of the teeth profiles 1, profile 9 and the cutting edge of the rack 7 generates the positive curvature 3, whereas profile 10 of the cutting edges 8 generates the negative curvature 4. Involute shape of cutting edges 8 of the racks 7 ensures a variable pressure angle $\alpha$ of the meshed teeth 1 and 5 of the pinion 2 and the toothed wheel 6 during machining. In turn, variable pressure angle during machining teeth 1 and 5 leads to variable base circles, from which involute profiles 3 of the tooth 1 and the pinion 2, as well as profiles 4 of the tooth 5 and the pinion 6 are being unwound. Profiles of teeth 1 of the pinion 2 and the teeth 5 of the gear wheel 6 are shaped by means of racks with an involute profile of their cutting edges and a constant base circle $R_z$ thereof as determined by the apparent number of teeth $Z_n$ and a constant pressure angle $\alpha_{ON}$, said racks being set in such a position relative to the pinion 2 and gear wheel 6 to be machined as to obtain the pressure angle $\alpha$ on the generating circles $r_1$ and $r_2$ according to the following relationship:

$$\alpha = \alpha_{ON} + \beta$$

$$\beta = \frac{180}{\pi} (\text{tg } \alpha_{AN} - \text{tg } \alpha_{ON})$$

where:
- $\alpha$—pressure angle of the intermating generating circles $r_1$ and $r_2$
- $\alpha_{ON}$—constant pressure angle of machining racks
- $\beta$—angle of rotation of the pressure angle $\alpha_{ON}$ around ON axis of machining racks
- $\alpha_{AN}$—angle of profile of involute cutting edges.

As a result of machining the tooth profiles of the gear transmissions using the method according to this invention the meshing geometry with the following parameters has been obtained:
- contact ratios: 1.25; 1.3; 1.5;
- addendum $h_g$ of tooth 1 expressed in terms of the tooth module equal to: 1.3 m; 1.5 m; 1.6 m;
- height $h_s$ of tooth root 1 expressed limited by the profile angle $\alpha_z$ equal to 8 degrees, 10 degrees, 15 degrees;
- height $H_s$ of tooth root 5 equal to 1.5 m, 1.7 m, and 1.8 m increased by the amount of the radial clearance $l_p = 0.2$ mm,
- addendum $H_g$ of the tooth 5 equal to the root height $h_s$ of tooth 1 of the pinion 2 decreased by the amount of the radial clearance $l_p = 0.2$ mm.

According to the invention the pressure angle $\alpha$ is minimum at the addendum of the tooth 5 of the gear wheel 6 and the maximum at the root of the tooth 5. In the case of a tooth 1 of the pinion 2 the pressure angle is maximum at the addendum of the tooth 1 and minimum at the root of the tooth 1.

We claim:

1. Gear transmission with a variable pressure angle, comprising teeth means having an involute profile with negative and positive curvatures, a meshing geometry of the teeth means having the following parameters: a contact ratio greater than one, a height (h) of an addendum of a tooth (1) of a pinion (2) being a function of its module (m) determined by the following relationship: $m < h_g < 1.8$ m, a height ($h_s$) of a root of the tooth (1) limited by a profile angle ($\alpha_z$) equal to: $\alpha_z \geq 8$ degrees, a height ($H_s$) of a root of a tooth (5) of a gear wheel (6) determined by the following relationship: $m < H_s < 1.8$ m increased by the amount of a radial clearance ($l_p$) and a height ($H_g$) of an addendum of the tooth (5) equal to the height ($h_s$) of the root tooth (1) decreased by the amount of the radial clearance ($l_p$).

2. Method of generating tooth profiles of a gear transmission having variable pressure angle and concave and convex tooth profiles with cutting racks comprising shaping the profiles of teeth (1) of a pinion (2) and teeth (5) of a gear wheel (6) with special racks having an involute profile of their cutting edges and using a constant base circle ($R_z$), said base circle being determined from the apparent number ($Z_n$) of the teeth and a constant pressure angle ($\alpha_{ON}$), said racks being set in such a position relative to the pinion (2) to be machined as to obtain a pressure angle ($\alpha$) on generating wheels ($r_1$ and $r_2$) determined by the relationship given below:

$$\alpha = \alpha_{ON} + \beta$$

$$\beta = \frac{180}{\pi} (\text{tg } \alpha_{AN} - \text{tg } \alpha_{ON})$$

where:
- $\alpha$—pressure angle of the intermated base circles;
- $\alpha_{ON}$—constant pressure angle of the machining racks;
- $\beta$—angle of rotation of the constant pressure angle $\alpha_{ON}$ around axis ON of the machining racks; and
- $\alpha_{AN}$—angle of involute profile of cutting edges.

* * * * *